United States Patent
Holmes

(10) Patent No.: US 11,516,676 B1
(45) Date of Patent: Nov. 29, 2022

(54) SECURE PROVISIONING OF ELECTRONIC SUBSCRIBER IDENTITY MODULE (ESIM) PROFILES

(71) Applicant: T-Mobile Innovations LLC, Overland Park, KS (US)

(72) Inventor: David William James Holmes, Sammamish, WA (US)

(73) Assignee: Sprint Communications Company LP, Overland Park, KS (US)

( * ) Notice: Subject to any disclaimer, the term of this patent is extended or adjusted under 35 U.S.C. 154(b) by 0 days.

(21) Appl. No.: 17/375,836

(22) Filed: Jul. 14, 2021

(51) Int. Cl.
  *H04W 12/72* (2021.01)
  *H04W 8/18* (2009.01)

(52) U.S. Cl.
  CPC .......... *H04W 12/72* (2021.01); *H04W 8/183* (2013.01)

(58) Field of Classification Search
  CPC .............................. H04W 12/72; H04W 8/183
  See application file for complete search history.

(56) References Cited

U.S. PATENT DOCUMENTS

| | | | |
|---|---|---|---|
| 11,323,877 B1* | 5/2022 | Verma | H04W 8/183 |
| 2017/0280321 A1* | 9/2017 | Caceres | G06F 21/34 |
| 2018/0103370 A1* | 4/2018 | Park | H04W 8/20 |
| 2020/0015069 A1* | 1/2020 | Anslot | H04L 63/0853 |
| 2021/0385635 A1* | 12/2021 | Johansson | H04W 4/50 |

* cited by examiner

*Primary Examiner* — Barry W Taylor

(57) ABSTRACT

A method of providing an electronic subscriber identity module (eSIM) profile to a wireless communication device. The method comprises receiving an eSIM profile provisioning request by a subscription manager-data preparation+ (SM-DP+) server, wherein the provisioning request comprises an embedded UICC identifier (EID) number, a private identity code, and wireless communication service subscription information; building an eSIM profile package by the SM-DP+ server based in part on the wireless communication service subscription information, wherein the eSIM profile package comprises an eSIM profile, the EID number, and the private identity code; sending a notification of the availability of the eSIM profile by the SM-DP+ server to a subscription manager-discovery server (SM-DS server), wherein the notification comprises the EID number and the private identity code; and transmitting the eSIM profile package by the SM-DP+ server to the wireless communication device.

20 Claims, 9 Drawing Sheets

SECURE PROVISIONING OF ELECTRONIC SUBSCRIBER IDENTITY MODULE (ESIM) PROFILES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may complete an authentication process with a cell site to obtain a wireless communication link from the cell site and to thereby obtain communication access to the radio access network that the cell site is a part of. This may involve the wireless communication device radio modem obtaining network access keys or network access credentials from an embedded universal integrated circuit card (eUICC) that may be provisioned with network access keys and/or network access credentials, with branding information, with applications, and other data artifacts. The radio modem may then obtain the network access keys or network access credentials from the eUICC and provide those network access keys or network access credentials to the cell site to obtain a wireless communication link. In some contexts, an eUICC may be referred to as an embedded subscriber identity module (eSIM), and the set of wireless communication service carrier data and wireless communication service subscriber data stored in the eSIM (e.g., network access keys, network access credentials, branding information, applications, and other data artifacts) is commonly referred to as an eSIM profile. The eUICC of the wireless communication device may initially be empty—that is initially no eSIM profile may be installed in the eUICC.

SUMMARY

In an embodiment, a method of providing an electronic subscriber identity module (eSIM) profile to a wireless communication device is disclosed. The method comprises receiving an eSIM profile provisioning request by a subscription manager-data preparation+ (SM-DP+) server, wherein the provisioning request comprises an embedded UICC identifier (EID) number, a private identity code, and wireless communication service subscription information, building an eSIM profile package by the SM-DP+ server based in part on the wireless communication service subscription information, wherein the eSIM profile package comprises an eSIM profile, the EID number, and the private identity code, and sending a notification of the availability of the eSIM profile by the SM-DP+ server to a subscription manager-discovery server (SM-DS server), wherein the notification comprises the EID number and the private identity code. The method further comprises receiving a request to download the eSIM profile from a wireless communication device associated with the EID number and associated with the private identity code and transmitting the eSIM profile package by the SM-DP+ server to the wireless communication device, whereby the wireless communication device is enabled to detect and reject attempts to install an unauthorized eSIM profile on the wireless communication device by parties that do not know the private identity code.

In another embodiment, a method of managing electronic subscriber identity module (eSIM) profiles on a wireless communication device is disclosed. The method comprises receiving a first input by an eSIM remote manager executing on a computer system, wherein the first input identifies a private identity code and associating that private identity code to a wireless communication device and storing the association of the private identity code and an identity of the wireless communication device by the eSIM remote manager in a non-transitory memory of the eSIM remote manager. The method further comprises receiving a second input by the eSIM remote manager, wherein the second input comprises the identity of the wireless communication device and identifies a command to download an eSIM profile, a command to install an eSIM profile, a command to enable an eSIM profile, a command to disable an eSIM profile, a command to read a status of an embedded universal integrated circuit card (eUICC) of the wireless communication device, or a command to delete an eSIM profile. The method further comprises looking up the stored private identity code by the eSIM remote manager based on the identity of the wireless communication device received in the second input, establishing communication with the wireless communication device by the eSIM remote manager, and sending a command message by the eSIM remote manager to the wireless communication device, wherein the command message comprises the private identity code and an identity of the command identified in the second input received by the eSIM remote manager, whereby the wireless communication device is able to detect and reject attempts to manage an eSIM profile of the wireless communication device by parties that do not know the private identity code.

In yet another embodiment, a wireless communication device is disclosed. The wireless communication device comprises a radio transceiver comprising a modem, a non-transitory memory, a processor coupled to the non-transitory memory, an embedded universal integrated circuit card (eUICC) coupled to the modem, and an application stored in the non-transitory memory. When executed by the processor, the application receives a notification message that an electronic subscriber identification module (eSIM) profile is ready for downloading, wherein the notification comprises a private identity code, compares the private identity code received in the notification message to a private identity code stored in the non-transitory memory, determines that the private identity code received in the notification message matches the private identity code stored in the non-transitory memory, and transmits an eSIM profile download request message via the radio transceiver to a subscription manager-data preparation+ (SM-DP+) server, wherein the request message does not comprise the private identity code. The application further receives an eSIM profile package from the SM-DP+ server comprising an eSIM profile and a private identity code, compares the private identity code received in the eSIM profile package to the private identity code stored in the non-transitory memory, determines that the private identity code received in the eSIM profile package matches the private identity code stored in the non-transitory memory, and installs the eSIM profile in the eUICC.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
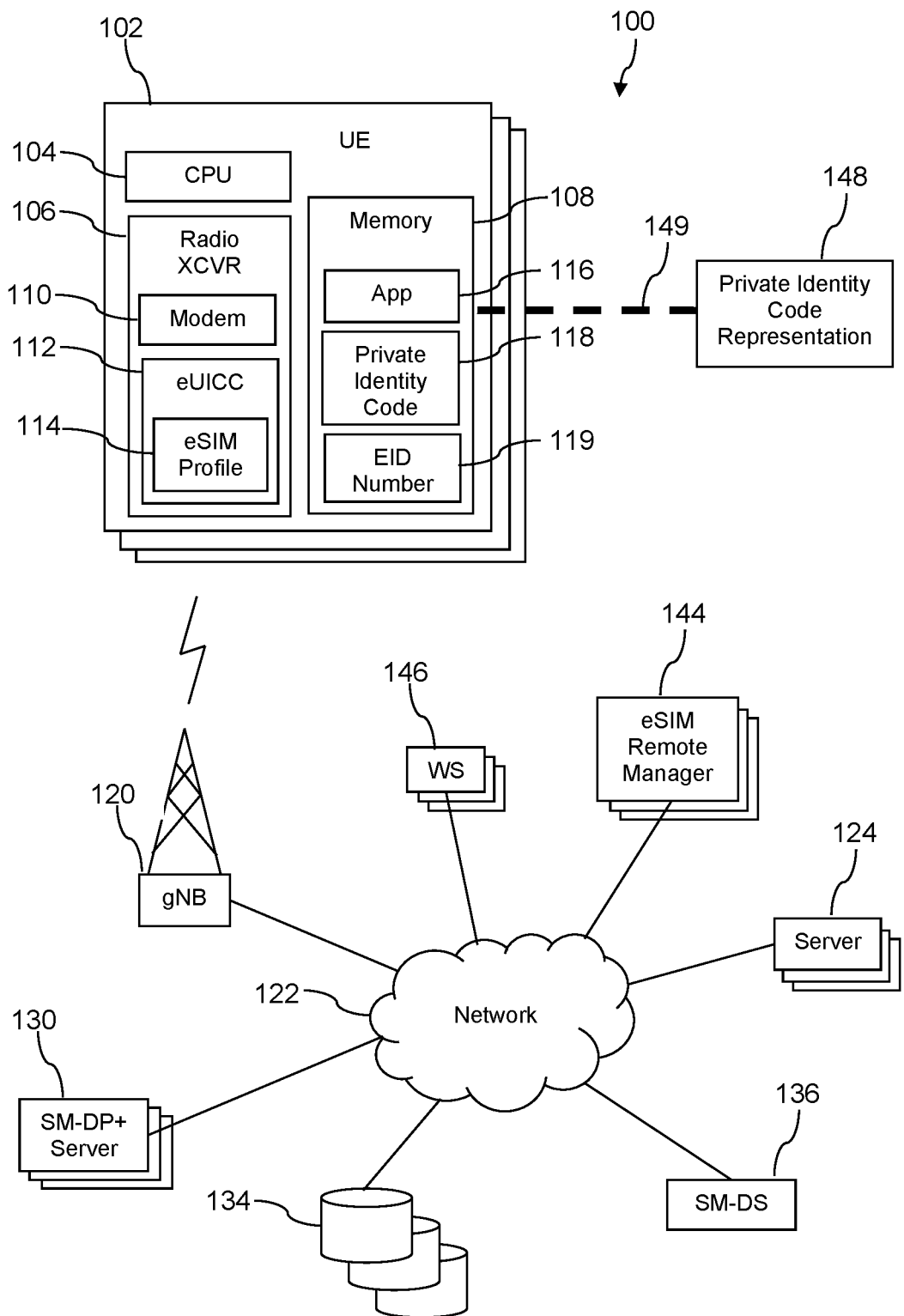
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some Internet of things (IoT) devices are simple devices that have a limited human interface and may only have capacity for storing a single electronic subscriber identity module (eSIM) profile. Some of these simple IoT devices are provisioned with an eSIM profile in the field—that is after being delivered to an end user, such as a private individual or to an enterprise. The typical process by which this type of IoT device is provisioned with an eSIM profile is (A) an eSIM profile is generated for the device by a subscription manager-data preparation+ (SM-DP+) platform, (B) the SM-DP+ platform informs a subscription manager-discovery server (SM-DS), (C) the SM-DS sends a notification to the IoT device that there is an eSIM profile waiting for the IoT device to download at the SM-DP+ platform, and (D) the IoT device reaches out to the SM-DP+ platform and downloads the eSIM profile. An identity that is typically used in this process is an embedded UICC identifier (EID) number associated with the embedded universal integrated circuit card (eUICC) of the IoT device. For further details on GSMA eSIM provisioning, see RSP Architecture Version 2.3, a non-binding permanent reference document published by the GSM Association.

But the EID number is a "publicly known" number, and consequently use of this EID number to manage the eSIM provisioning process may present a security vulnerability. A malefactor could derail the smooth operation of this system in a number of different ways based simply on knowing the EID number or number range associated with the IoT device(s). For example, the malefactor could infiltrate a bad eSIM profile to the SM-DP+ platform indexed by the well-known EID number. The present disclosure teaches avoiding this vulnerability by introducing a private identity code that is presented in combination with the well-known EID number to interact with the system. Additionally, when an eSIM profile is built, it will be associated with the private identity code, for example the eSIM profile may be encapsulated in an eSIM profile package that also includes the private identity code and the EID number. The IoT device downloads the eSIM profile package. The IoT device, before installing the downloaded eSIM profile, compares the private identity code downloaded with the eSIM profile in the eSIM profile package to the private identity code stored in the IoT device. If the stored private identity code and the downloaded private identity code do not match, the IoT device does not install the downloaded eSIM profile. If the stored private identity code and the downloaded private identity code do match, the IoT device may install the downloaded eSIM profile.

In an embodiment, the private identity code may be provided affixed to the IoT device or to packaging the IoT device is sold in, for example represented in the form of a one-dimensional bar code, a two-dimensional bar code, a quick response (QR) code, a ShotCode, a Semacode, or in some other representational form. An owner of the IoT device may initiate the eSIM profile deployment process by inputting the private identity code and the EID number of the IoT device, read from the IoT device or packaging, into a web interface provided by a wireless communication service provider. The back-end of the web interface of the wireless communication service provider may then invoke a method on an SM-DP+ platform by providing the private identity code and the EID number along with other information pertinent to the subscription communication service to be provided to the IoT device. This triggers the SM-DP+ platform to generate the eSIM profile for the IoT device and the rest of the eSIM provisioning process described briefly above.

The private identity code may be printed on a removable label or tab of the IoT device packaging or affixed to the IoT device itself. Once the private identity code has been provided, it can be removed, to avoid a malefactor reading the private identity code off the IoT device when it is installed in the field. In an embodiment, the information affixed to the IoT device packaging or to the IoT device may not be the private identity code itself but instead an index to where the private identity code may be looked up. This index may be used by the wireless communication service provider to access the private identity code and send the private identity code to the SM-DP+ platform. Alternatively, the wireless communication service provider may only provide the index to the SM-DP+ server, and the SM-DP+ server maps the index to the actual private identity code, thereby keeping the private identity code secret even from the wireless communication service provider. The IoT device itself would never transmit the private identity code, hence the private identity code cannot be discovered by monitoring the transmissions of the IoT device. The IoT device only uses the private identity code stored within it to corroborate that the private identity code transmitted to it with the eSIM profile download is a match.

The private identity code may be referred to as a private EID number in some contexts. The private identity code can be any length number string or alphanumeric string. In an embodiment, the private identity code is greater than 20 bytes long and less than 150 bytes long. In an embodiment, the private identity code is greater than 25 bytes long and less than 50 bytes long. The private identity code can be randomly generated. It is not necessary that the private identity code be unique across all IoT devices, only that it be sufficiently long to reduce the probability of guessing the private identity code associated with a specific IoT device by a brute-force process. In an embodiment, both the private identity code and the EID number are used to transmit the eSIM profile to the IoT device (e.g., the private identity code and EID number are included along with the eSIM profile in the eSIM profile package that is downloaded to the IoT device), and hence a brute force attack would have to focus a great deal of effort on a specific single IoT device in an attempt to guess the private identity code. The IoT device may incorporate logic that defeats such a brute force attack, for example locking after a pre-defined number of failed attempts—5 failed attempts for example. A consequence of this approach is that the IoT device has to be physically in the hands of the person who will trigger the eSIM profile deployment process.

In an embodiment, the use of the private identity code in initial installation of an eSIM profile in the IoT device may be extended to secure communications between an eSIM remote manager and the IoT device. An eSIM remote manager may send eSIM profile management commands to IoT devices, for example to activate an eSIM profile, to deactivate an eSIM profile, to delete an eSIM profile, to download an eSIM profile, to install an eSIM profile, and to learn what eSIM profile is currently enabled. The commands sent by the eSIM remote manager to the IoT device may comprise the private identity code and the EID number, and the IoT device can compare the received private identity code to its stored private identity code. If the private identity codes match, it can execute the command; if the private identity codes do not match, if can reject the command. In an embodiment, the use of the private identity code in initial installation of eSIM profiles and in management of eSIM profiles by an eSIM remote manager can be extended to other wireless communication devices including smart phones, wearable computers, tablet computers, notebook computers, and laptop computers. In an embodiment, the eSIM remote manager may be provided using Remote Profile Management functions enacted by the SM-DP+ server. For further details on Remote Profile Management functions see GSMA Permanent Reference Documents SGP.21 and SGP.22.

The present disclosure teaches a computer solution for a computer problem rooted in computer technology. The IoT devices, the SM-DP+ server, and SM-DS are all instances of computer technology. Securely delivering eSIM profiles to a simple IoT device in the field (e.g., where the IoT device has only a rudimentary human interface or no human interface) is a problem that arises in the context of deploying the new technology of IoT devices. The present disclosure provides a particular technical solution—a computer solution—to this computer problem. Additionally, this particular technical solution provides benefits over at least some alternative solutions, such as solutions that would rely on heavy weight communication protocols would provide security, such as heavy encryption methods or virtual private network (VPN) methods. It is thought that this relatively light weight particular solution can provide good security without encumbering the networks and processors involved with excessive processing burdens. Conserving the processing burden on IoT devices may be desirable to conserve limited stores of energy (e.g., battery power) available to simple IoT devices.

Turning now to FIG. 1, a communication system 100 is described. In an embodiment, system 100 comprises a user equipment (UE) 102 that comprises a processor 104, a radio transceiver 106, and a non-transitory memory 108. The UE 102 may be an internet of things (IoT) device, a smart phone, a wearable computer, a notebook computer, a tablet computer, a laptop computer, or other wireless communication enabled electronic device. The radio transceiver 106 comprises a modem 110 and an embedded universal integrated circuit card (eUICC) 112. After it has been provisioned, the eUICC 112 may store an eSIM profile 114. The eSIM profile 114 may comprise wireless communication service provider data and subscriber data. The eSIM profile 114 may comprise one or more of a phone number, network access keys and/or network access credentials, encryption keys, preferred roaming lists (PRLs), executable applications, branding content, or other data. The modem 110 may access the eUICC 112 and the eSIM profile 114 to obtain credentials or keys to conduct authentication processes with a cell site 120 whereby to obtain a wireless communication link. In an embodiment, the non-transitory memory 108 comprises an application 116, a private identity code 118, and an embedded UICC identifier (EID) number 119.

The radio transceiver 106 of the UE 102 is configured to establish a wireless communication link with the cell site 120 according to a 5G, a long-term evolution (LTE), a code division multiple access (CDMA), or a global system for mobile communications (GSM) telecommunication protocol. The UE 102 may communication via the cell site 120 to a network 122 and via the network 122 to other devices such as other UEs 102 and to servers 124. The network 122 comprises one or more private networks, one or more public networks, or a combination thereof. In an embodiment, the system 100 comprises an SM-DP+ server 130 communicatively coupled to the network 122, a data store 134 communicatively coupled to the network 122, an SM-DS 136 communicatively coupled to the network 122, an eSIM remote manager 144 communicatively coupled to the network, and a work station 146 communicatively coupled to the network 122. In an embodiment, the eSIM remote manager 144 may be provided using Remote Profile Management functions enacted by the SM-DP+ server 130. For further details on Remote Profile Management functions see GSMA Permanent Reference Documents SGP.21 and SGP.22.

The system 100 may comprise any number of UEs 102, any number of cell sites 120, any number of servers 124, any number of SM-DP+ servers 130, any number of data stores 134, any number of SM-DSs 136, any number of eSIM remote managers 144 and any number of work stations 146. The servers 124, the SM-DP+ server 130, the data store 134, the SM-DS server 136, the eSIM remote manager 144, and the work station 146 may be implemented as computer systems. Computer systems are described further hereinafter.

Initially the UE 102 may not be provisioned with an eSIM profile 114. For example, when an IoT device is purchased by an individual or by an enterprise, it may be unknown what wireless communication service provider the owner of the IoT device will engage with to obtain wireless communication service for the IoT device. Because at least some of the content of the eSIM profile 114 is associated with or determined by a wireless communication service provider, the eSIM profile 114 may desirably be created, downloaded to, and installed in the eUICC 112 only after the UE 102 has been associated with a given wireless communication service provider, for example after a subscription account has been established for or associated to the UE 102. In this state, the UE 102 may only be able to establish limited wireless communications through the cell site 120. For example, the wireless communications of the UE 102 may be restricted to receiving messages from the SM-DS server 136 and sending messages to and receiving messages from the SM-DP+ server 130. Alternatively, the UE 102 initially may be provisioned with an eSIM profile that restricts the wireless communication service access allowed to the UE 102 to receiving messages from the SM-DS server 136 and sending messages to and receiving messages from the SM-DP+ server 130.

In an embodiment, private identity code 118 and the EID number 119 is stored in the non-transitory memory 108 by an original equipment manufacturer (OEM). While the application 116, the private identity code 118, and the EID number 119 are represented In FIG. 1 as being stored in the non-transitory memory 108, in an embodiment, either the non-transitory memory 108 may be located within the eUICC 112 or the application 116, the private identity code 118, and the EID number 119 may be stored in the eUICC 112 instead of in the non-transitory memory 108.

The OEM may attach a private identity code representation 148 via removable attachment 149 to the UE 102 or to a packaging in which the UE 102 is delivered. Alternatively, if a plurality of UEs 102 are purchased together, the OEM may provide a spreadsheet with the private identity codes printed associated with an EID number of the different UEs 102 and/or associated with a mobile equipment identity (MEID) or an international mobile equipment identity (IMEI). Alternatively, the OEM may provide a data file that comprises entries associating UEs 102 with the private identity codes and EID numbers (and possibly the MEID and/or NEI). In another embodiment, a user may configure the UE 102 with the private identity code 118, for example via near field communication (NFC) or via a wired link (e.g., a dongle) between a smart phone or laptop computer of the user and the UE 102. The user device (e.g., smart phone or laptop) may execute an application that establishes communication with the application 116 and that configures the private identity code 118 into the non-transitory memory 108 of the UE 102.

In an embodiment, a user may use a work station 146 (e.g., a laptop computer or smart phone communicatively coupled to the network 122) to access a web site provided by a server 124 operated by a wireless communication service provider to initiate provisioning an eSIM profile 114 to the UE 102 or to initiate provisioning eSIM profiles 114 to a plurality of UEs 102. The web site may be provided by a wireless communication service provider for use by users to initialize their UEs 102 to receive wireless communication service. The work station 146 may provide the web site with the private identity code obtained from the private identity code representation 148 that is initially physically associated with the UE 102 or with the packaging in which the UE 102 is delivered to the user. Alternatively, the work station 146 may provide the web site with an index that can be used to look-up the private identity code. Alternatively, the user may scan the private identity code representation 148 with a scanner or camera and send the scanned image of the private identity code representation 148 to the web site provided by the server 124 operated by the wireless communication service provider. The user may provide the web site an EID number associated with the eUICC 112 of the UE 102. The workstation 146 may provide the information by executing a data file or inputting a data file that comprises the private identity code and EID numbers of a plurality of UEs 102 to the web site. In an embodiment, the work station 146 may interact with an application programming interface (API) provided by the server 124 of the wireless communication service provider, rather than using a web site, to complete like operations.

The user may previously have established a wireless communication service subscription account for the UE 102 with the wireless communication service provider. This might be a single line associated with a single UE 102. This might be an additional line among a plurality of lines on a wireless communication service subscription account owned by the user. For example, the user may own thousands of UEs 102, tens of thousands of UEs 102, or even hundreds of thousands of UEs 102 all of which receive wireless communication service through the same wireless communication service provider.

The server 124 of the wireless communication service provider may look up information pertaining to the wireless communication service subscription account and send the service provider information and the private identity code in a request to build a eSIM profile for the UE 102 to the SM-DP+ server 130. For example, the pertinent information about the subscription account may comprise a type approval code (TAC code) and an international mobile equipment identity (IMEI). The pertinent information may comprise a phone number to be associated to the UE 102. Alternatively, the server 124 may not send wireless communication service subscription account related information, for example in the instance when the SM-DP+ server 130 is operated by the subject wireless communication service provider and is able to provide the appropriate wireless service provider information itself. The server 124 may learn the private identity code by decoding a scanned image received via the web site from the user, for example by accessing a data store. Alternatively, the server 124 may use an index to the private identity code received via the web site from the user to look-up the private identity code in a database, and send the service provider information and the looked-up private identity code in the request to the SM-DP+ server 130. Alternatively, the server 124 may send the service provider information and an index to the private identity code in the request to the SM-DP+ server. The server 124 also may send the EID number associated with the eUICC 112 of the UE 102 in the request to the SM-DP+ server 130.

In response to receiving the request to build the eSIM profile 114, the SM-DP+ server 130 builds the eSIM profile 114 and stores it in the data store 134. In an embodiment, the eSIM profile 114 is included in an eSIM profile package along with the private identity code and with the EID number associated with the eUICC 112 of the UE 102. After making the eSIM profile 114, the SM-DP+ server 130 sends a notification via the network 122 to the SM-DS 136 that an eSIM profile 114 is ready for the UE 102. In an embodiment, the SM-DP+ server 130 sends the private identity code and the EID number along with the notification to the SM-DS 136.

In response to receiving the notification from the SM-DP+ sever 130, the SM-DS 136 sends a notification to the UE 102 that indicates that an eSIM profile 114 is ready for it to download and provides the address of the SM-DP+ server 130. In an embodiment, the notification sent by the SM-DS 136 comprises the private identity code 118 and the EID number associated with the eUICC 112 of the UE 102. The UE 102 and/or the application 116 may receive the notification via the radio transceiver 106 or via a different communication interface, for example over a wired connection to a device (e.g., the work station 146) that is connected to the Internet and/or to the network 122.

In an embodiment, the SM-DS 136 does not send notification to the UE 102 but rather receives a query from the application 116 executing on the processor 104, on a processor of the modem 110, or executing in the eUICC 112 of UE 102 asking if an eSIM profile is available. In this scenario, the SM-DS 136 uses identifying information provided by the UE 102 (e.g., the EID number or another identity excluding the private identity code 116) to look up the address of the SM-DP+ server 130 (e.g., the SM-DS 136 saves the address of the SM-DP+ server associated with the EID number on the event of receiving the notification from the SM-DP+ server) and returns this address to the UE 102. In an embodiment, the application 116 may be an IoT profile assistant (IPA). In an embodiment, the application 116 may be a local profile assistant (LPA).

In response, the application 116 of the UE 102 sends a request for the eSIM profile 114 to the SM-DP+ server 130. The UE 102 and/or the application 116 may send the request for the eSIM profile 114 to the SM-DP+ server via the radio transceiver 106 or via a different communication interface, for example over a wired connection to a device (e.g., the work station 146) that is connected to the Internet and/or the network 122. The application 116 sends identifying information in the request such as the EID number or another identifier (excluding the private identity code 118). The SM-DP+ server 130 looks up the eSIM profile package comprising the eSIM profile 114, the private identity code 118, and the EID number and sends the eSIM profile package to the application 116 on the UE 102. In an embodiment, the private identity code 118 and the EID number encapsulated in the eSIM package are encrypted.

The application 116 of the UE 102 receives the eSIM package, and reads the private identity code and the EID number in the eSIM package. The UE 102 and/or the application 116 may receive the eSIM package via the radio transceiver 106 or via a different communication interface, for example over a wired connection to a device (e.g., the work station 146) that is connected to the Internet and/or the network 122. In an embodiment, the application 116 decrypts the private identity code and the EID number. The application 116 compares the private identity code received in the eSIM package from the SM-DP+ server 130 to the private identity code 118 stored in the non-transitory memory. If the two private identity codes match, the application 116 copies the eSIM profile 114 into the eUICC 112, otherwise the application 116 does not copy the eSIM profile 114 into the eUICC 112. In an embodiment, the application 116 also compares the EID number received in the eSIM package from the SM-DP+ server 130 to the EID number 119 stored in the non-transitory memory 108, and only if these numbers match as well as the private identity codes does the application 116 install the eSIM profile 114 in the eUICC 112.

The removable attachment 149 may be broken to separate the private identity code representation 148 from the UE 102 and/or from the packaging in which the UE 102 is received, whereby to avoid an unauthorized person from obtaining the private identity code 118 and using it to attack or otherwise undermine the smooth operation of the communication system 100 in some way. The removable attachment 149 may be provided by adhering the private identity code representation 148 to the UE 102 or to the packaging of the UE. By pulling on the private identity code representation 148 it may be peeled off of the UE 102 or off of the packaging and disposed of. The removable attachment 149 may be a line of perforations that separates the packaging and the private identity code representation 148 and which can easily be torn at the line of perforations to remove the private identity code representation 148 so that it can be disposed of.

The eSIM remote manager 144 may be configured with a copy of the private identity code 118 by the user reading the private identity code representation 148 or by scanning it with a device and providing it to the eSIM remote manager 144. The eSIM remote manager 144 may execute on a mobile phone, on a wearable computer, on a laptop computer, on a tablet computer, or on a notebook computer. The eSIM remote manager 144 may be provided using Remote Profile Management functions enacted by the SM-DP+ server 130. For further details on Remote Profile Management functions see GSMA Permanent Reference Documents SGP.21 and SGP.22.

The eSIM remote manager 144 may decode the coded scan received from a camera. In an embodiment, the eSIM remote manager 144 may perform the role ascribed above to the work station 146 in the initial provisioning of the eSIM profile 114 to the eUICC 112 of the UE 102. The eSIM remote manager 144 can play a continuing role in managing the eSIM profile 114 installed and active in the eUICC 112 over the life of the UE 102. The eSIM remote manager 144 can send other commands to the application 116 of the UE 102 to manage the eSIM profile 114 installed in the eUICC 112, for example a command to download an eSIM profile 114 (e.g., a different eSIM profile), a command to install an eSIM profile 114, a command to enable an eSIM profile 114, a commend to deactivate an eSIM profile 114, a command to delete an eSIM profile 114 from the eUICC 112, a command to read the identity (e.g., version name) of an eSIM profile 114 currently enabled in the eUICC 112 of the UE 102. When sending the commands to the UE 102 and/or to the application 116, the eSIM remote manager 144 includes a private identity code, and the application 116 corroborates that the private identity code received with the command matches the private identity code 118 stored in the non-transitory memory 108. The application 116 may further corroborate that the EID number received with the command matches the EID number 119 stored in the non-transitory memory 108. In an embodiment, the eSIM remote manager 144 encrypts the private identity code and the EID number before sending them with the command to the UE 102 and/or the application 116.

Figure 2:
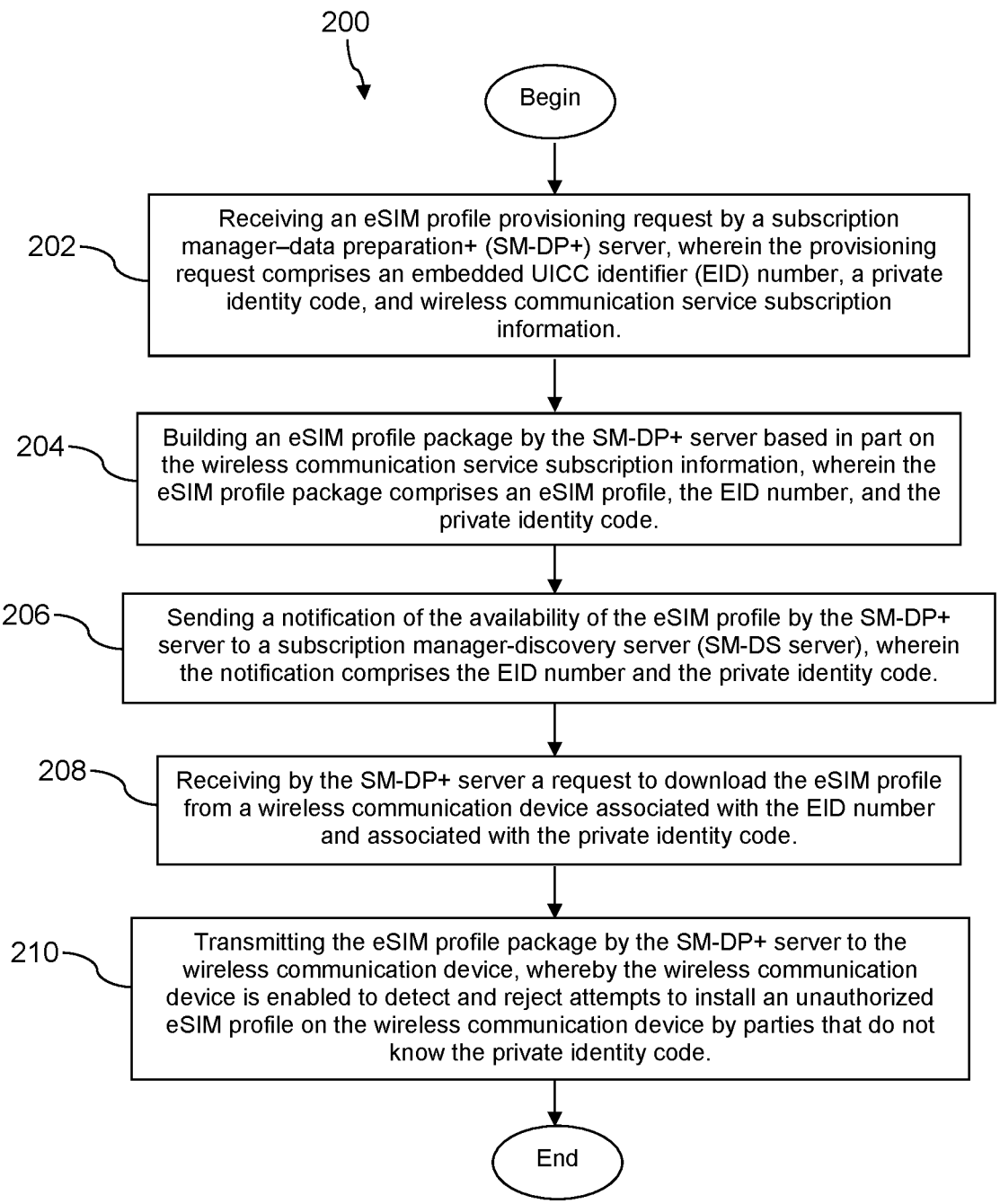
FIG. 2 is a flow chart of a method according to an embodiment of the disclosure.

Turning now to FIG. 2, a method 200 is described. In an embodiment, the method 200 is a method of providing an electronic subscriber identity module (eSIM) profile to a wireless communication device. At block 202, the method 200 comprises receiving an eSIM profile provisioning request by a subscription manager-data preparation+ (SM-DP+) server, wherein the provisioning request comprises an embedded UICC identifier (EID) number, a private identity code, and wireless communication service subscription information. The private identity code may be a string of digits and/or characters. In an embodiment, the private identity code is at least 3 bytes long and less than 25 bytes long. In an embodiment, the private identity code is at least 4 bytes long and less than 15 bytes long. In an embodiment, the private identity code is at least 6 bytes long and less than 10 bytes long. In an embodiment, the private identity code is at least 20 bytes long and less than 150 bytes long. In an embodiment, the private identity code is at least 25 bytes long and less than 50 bytes long. In an embodiment, the private identity code is at least 25 bytes long and less than 32 bytes long. In an embodiment, the private identity code is at least 32 bytes long and less than 40 bytes long. In an embodiment, the private identity code is at least 40 bytes long and less than 50 bytes long. In an embodiment, the wireless communication service subscription information comprises a type approval code and an international mobile equipment identity (IMEI). In an embodiment, the wireless communication service subscription information comprises network access keys and/or network access credentials. In an embodiment, the wireless communication service subscription information comprises branding information. In an embodiment, the wireless communication service subscription information comprises encryption keys. In an embodiment, the wireless communication service subscription information comprises preferred roaming lists (PRLs). In an embodiment, the wireless communication service subscription information comprises executable applications. In an embodiment, the wireless communication service information comprises an international mobile subscriber identity (IMSI) (e.g., a phone number).

At block 204, the method 200 comprises building an eSIM profile package by the SM-DP+ server based in part on the wireless communication service subscription information, wherein the eSIM profile package comprises an eSIM profile, the EID number, and the private identity code. In an embodiment, the eSIM profile comprises wireless communication service provider data and subscriber data. In an embodiment, the eSIM profile comprises at least two selected from a list consisting of a phone number, a network access key, a network access credential, an encryption key, a preferred roaming lists, and an executable application. At block 206, the method 200 comprises sending a notification of the availability of the eSIM profile by the SM-DP+ server to a subscription manager-discovery server (SM-DS server), wherein the notification comprises the EID number and the private identity code.

At block 208, the method 200 comprises receiving by the SM-DP+ server a request to download the eSIM profile from a wireless communication device associated with the EID number and associated with the private identity code. In an embodiment, the wireless communication device is an Internet of things (IoT) device. In an embodiment, the wireless communication device is a smart phone, a wearable computer, a laptop computer, a tablet computer, or a notebook computer. At block 210, the method 200 comprises, transmitting the eSIM profile package by the SM-DP+ server to the wireless communication device, whereby the wireless communication device is enabled to detect and reject attempts to install an unauthorized eSIM profile on the wireless communication device by parties that do not know the private identity code.

Figure 3:
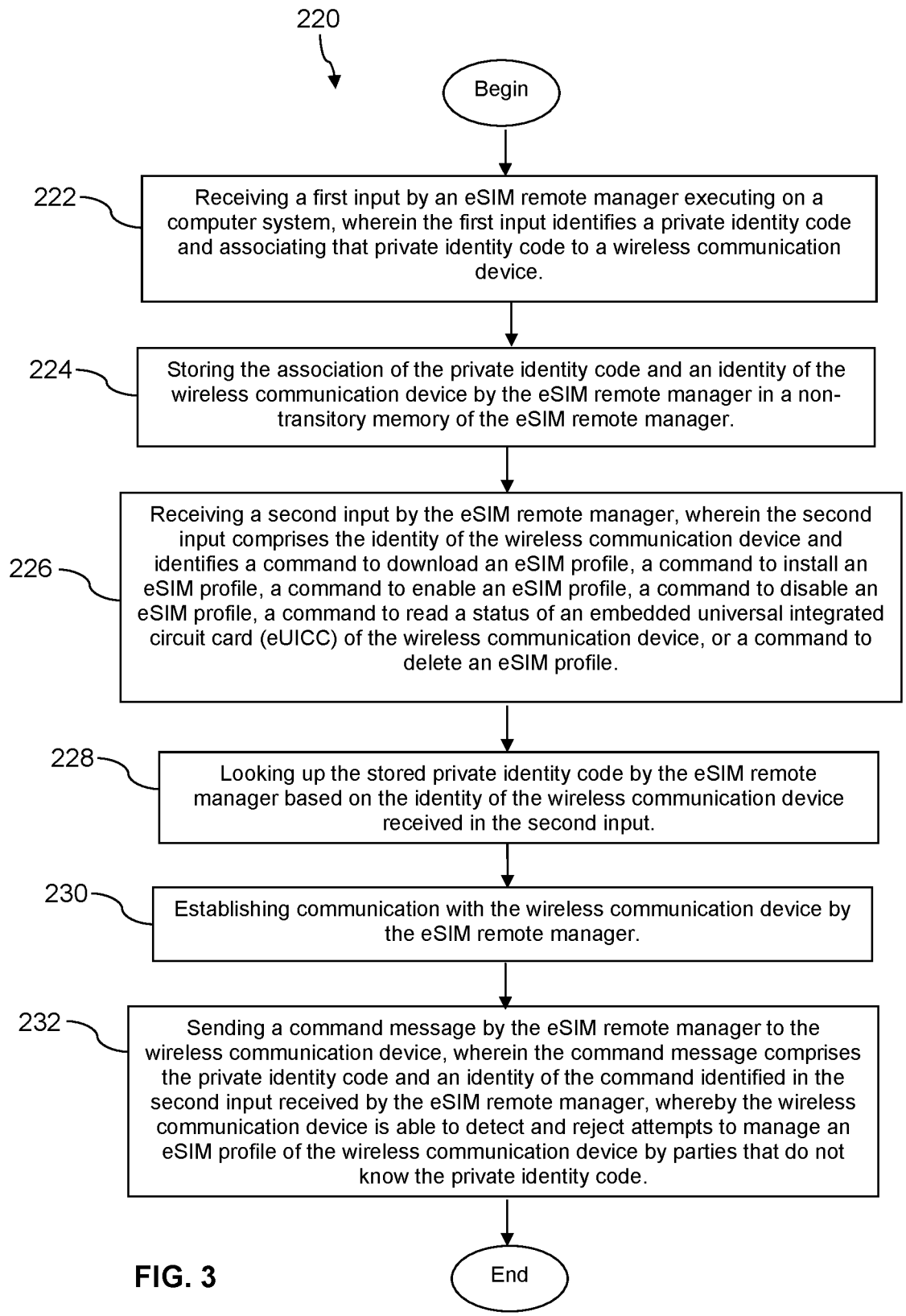
FIG. 3 is a flow chart of another method according to an embodiment of the disclosure.

Turning now to FIG. 3, a method 220 is described. In an embodiment, the method 220 is a method of managing electronic subscriber identity module (eSIM) profiles on a wireless communication device. At block 222, the method 220 comprises receiving a first input by an eSIM remote manager executing on a computer system, wherein the first input identifies a private identity code and associating that private identity code to a wireless communication device. In an embodiment, the eSIM remote manager may be provided on a mobile phone, on a wearable computer, on a laptop computer, on a tablet computer, or on a notebook computer. In an embodiment, the eSIM remote manager may be provided using Remote Profile Management functions executing on the SM-DP+ server 130. For further details on Remote Profile Management functions see GSMA Permanent Reference Documents SGP.21 and SGP.22.

In an embodiment, the wireless communication device is an Internet of things (IoT) device. In an embodiment, the wireless communication device is a smart phone, a wearable computer, a laptop computer, a tablet computer, or a notebook computer. In an embodiment, the first input provides the private identity code as a scanned image of a private identity code representation, and wherein receiving the first input comprises decoding the scanned image to obtain the private identity code. In an embodiment, the first input further identifies an embedded UICC identifier (EID) number associated with the wireless communication device, the eSIM remote manager stores the EID number with the private identity code and the identity of the wireless communication device, and the command message comprises the EID number. In an embodiment, the private identity code is at least 20 bytes long and less than 150 bytes long. In an embodiment, the private identity code is at least 25 bytes long and less than 150 bytes long.

At block 224, the method 220 comprises storing the association of the private identity code and an identity of the wireless communication device by the eSIM remote manager in a non-transitory memory of the eSIM remote manager. At block 226, the method 220 comprises receiving a second input by the eSIM remote manager, wherein the second input comprises the identity of the wireless communication device and identifies a command to download an eSIM profile, a command to install an eSIM profile, a command to enable an eSIM profile, a command to disable an eSIM profile, a command to read a status of an embedded universal integrated circuit card (eUICC) of the wireless communication device, or a command to delete an eSIM profile. At block 228, the method 220 comprises looking up the stored private identity code by the eSIM remote manager based on the identity of the wireless communication device received in the second input.

At block 230, the method 220 comprises establishing communication with the wireless communication device by the eSIM remote manager. At block 232, the method 220 comprises sending a command message by the eSIM remote manager to the wireless communication device, wherein the command message comprises the private identity code and an identity of the command identified in the second input received by the eSIM remote manager, whereby the wireless communication device is able to detect and reject attempts to manage an eSIM profile of the wireless communication device by parties that do not know the private identity code. In an embodiment, the private identity code of the command message sent by the eSIM remote manager is encrypted.

Figure 4:
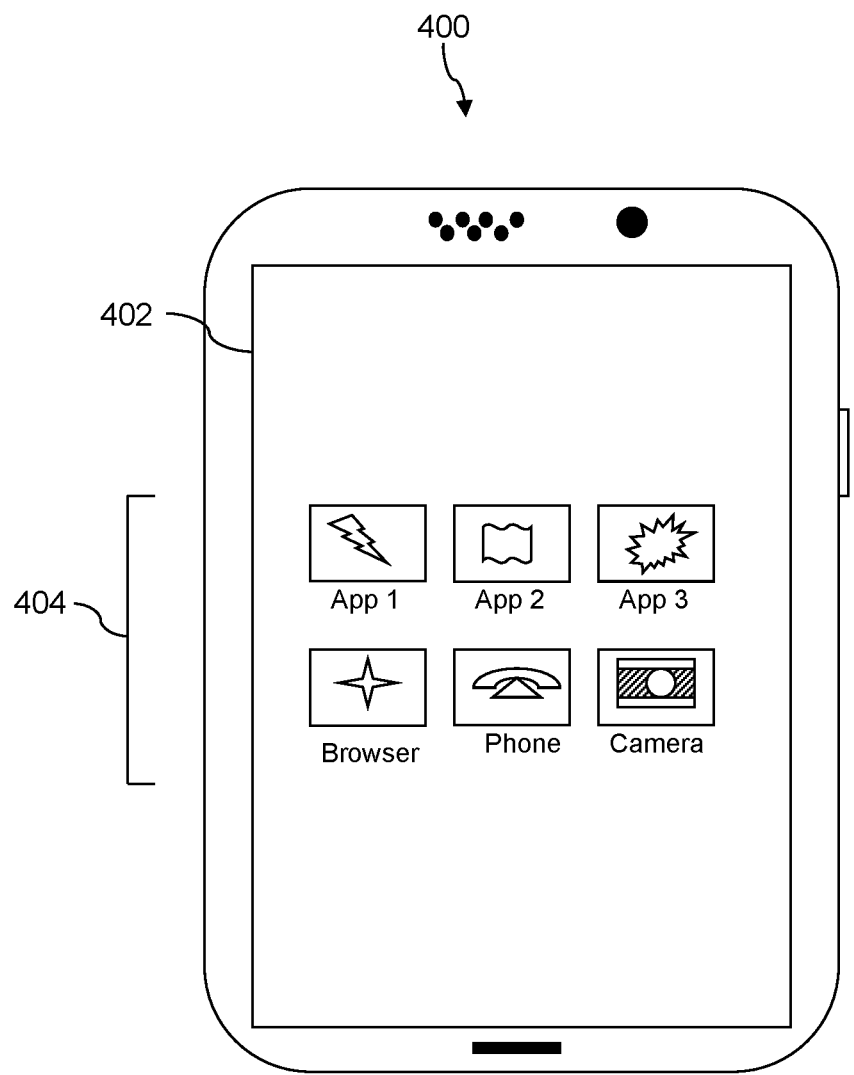
FIG. 4 is an illustration of a mobile phone according to an embodiment of the disclosure.

FIG. 4 depicts the user equipment (UE) 400, which is operable for implementing aspects of the present disclosure, but the present disclosure should not be limited to these implementations. At least some of the UEs 102 described above with reference to FIG. 1, FIG. 2, and FIG. 3 may be implemented in a form like UE 400. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402.

It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
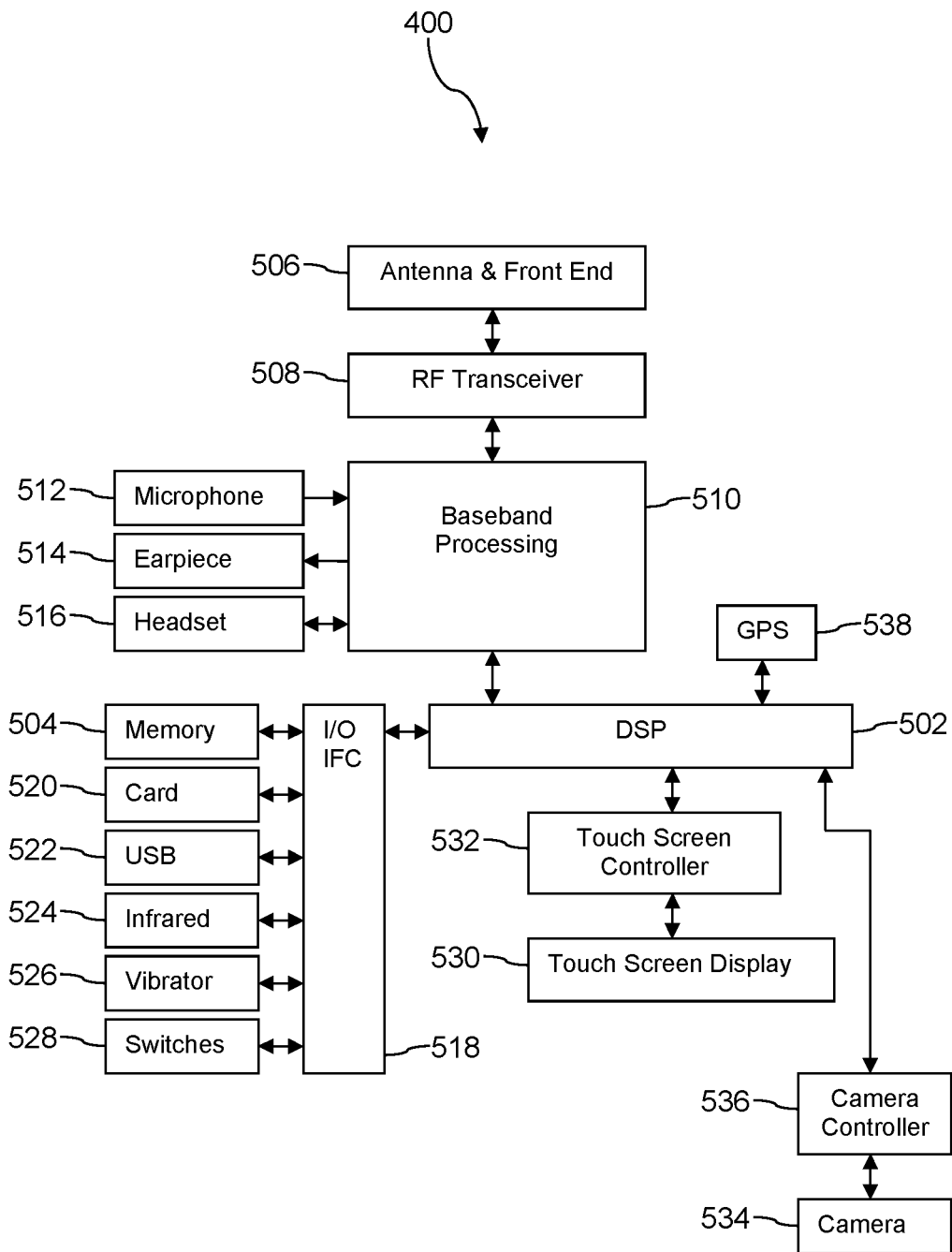
FIG. 5 is a block diagram of a hardware architecture of a user equipment (UE) according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
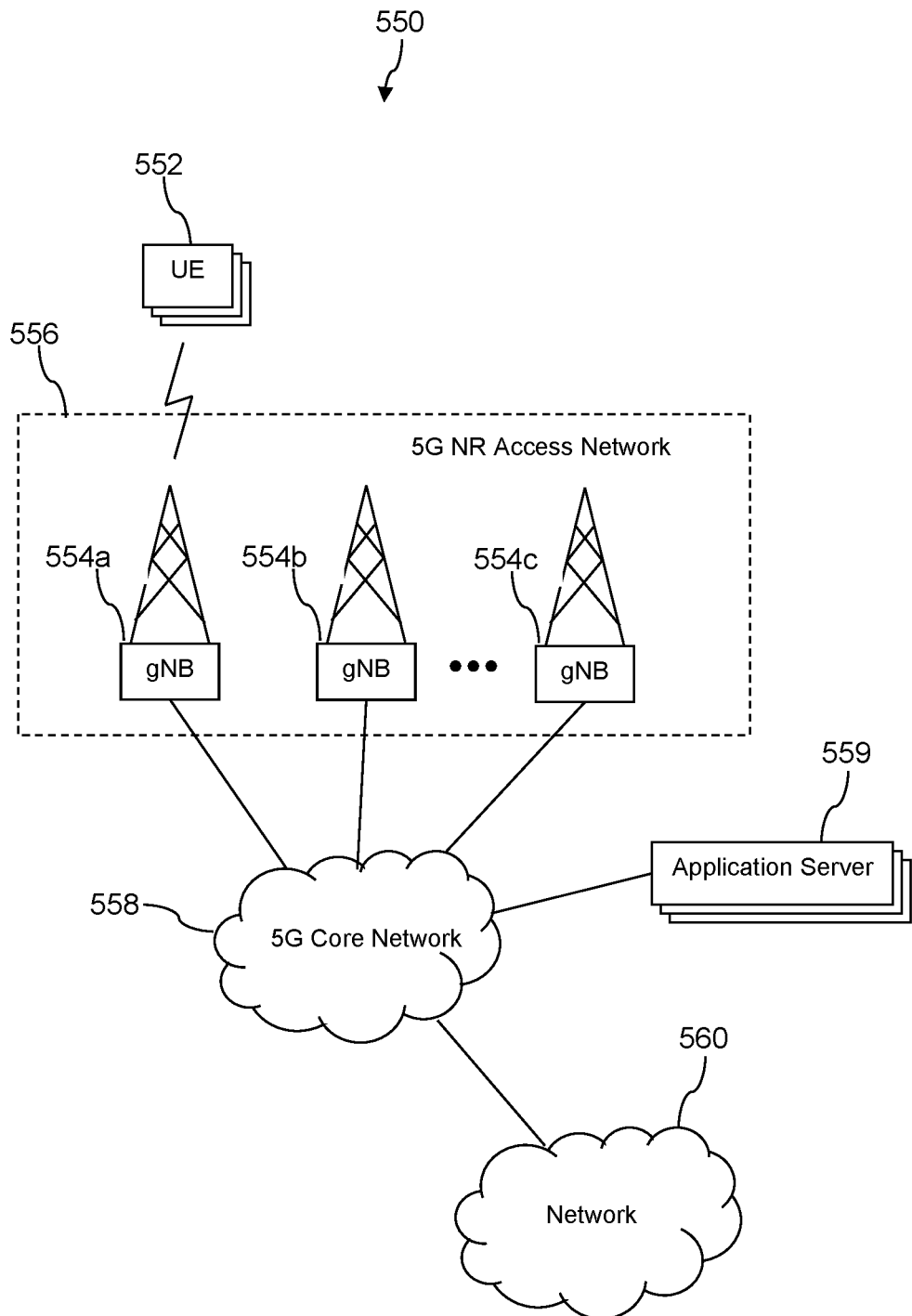
FIG. 6A is a block diagram of a 5G communication network according to an embodiment of the disclosure.

Turning now to FIG. 6A, an exemplary communication system 550 is described. At least a portion of the network 122 may be implemented in a form like communication system 550. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
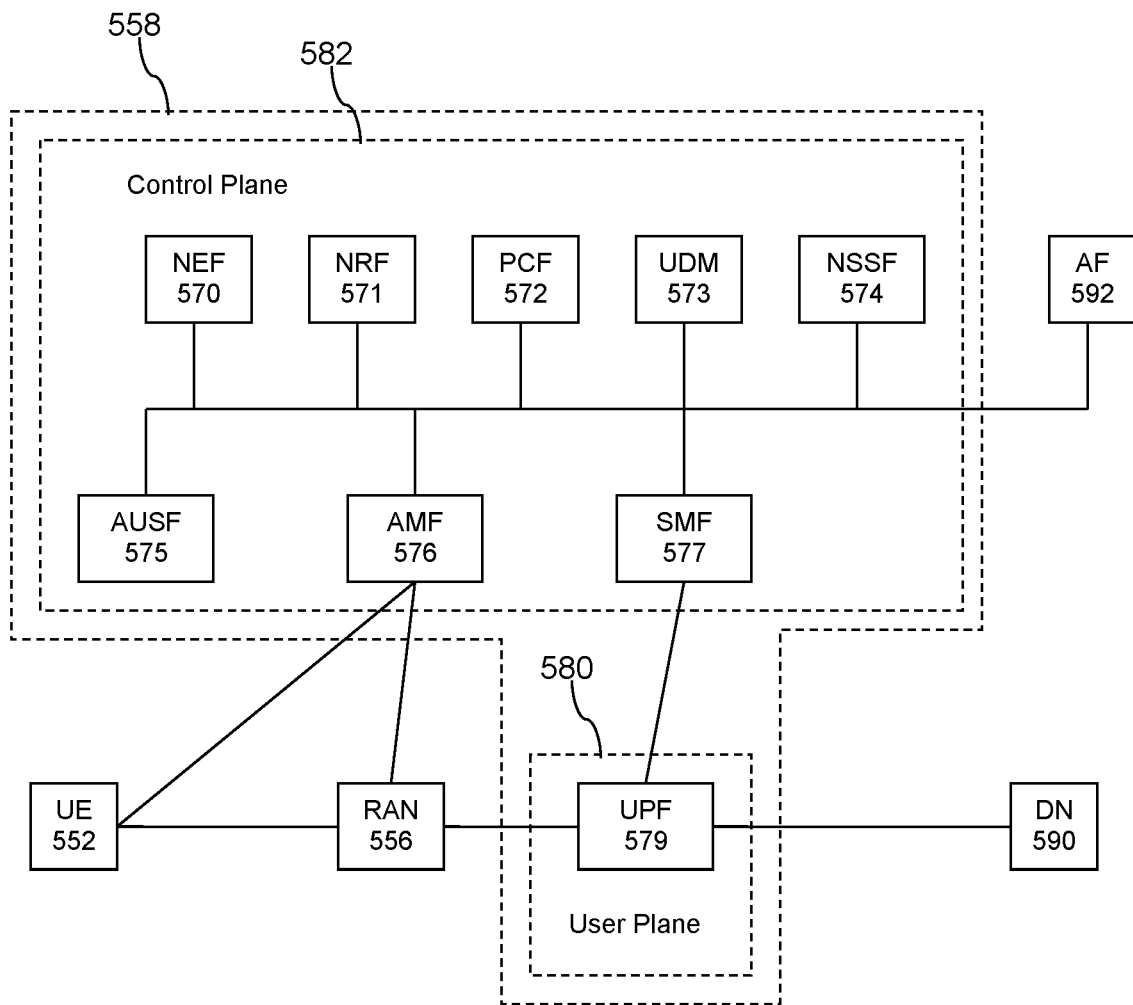
FIG. 6B is a block diagram of a core network of a 5G communication network according to an embodiment of the disclosure.

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7A:
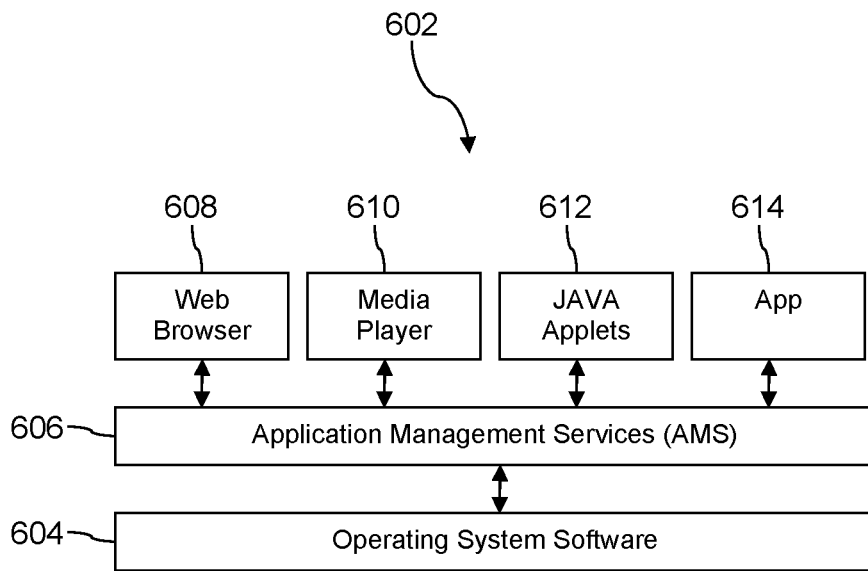
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
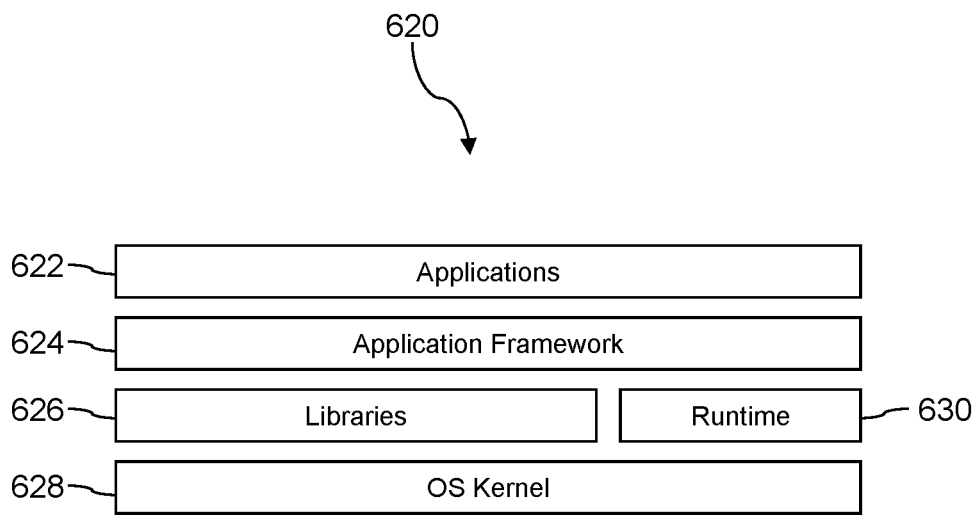
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
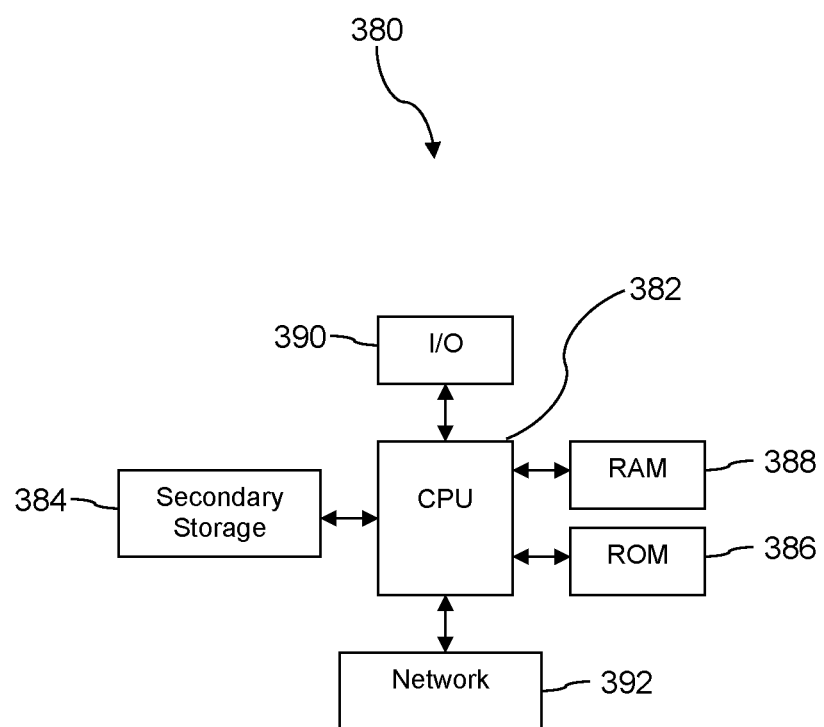
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing an electronic subscriber identity module (eSIM) profile to a wireless communication device, comprising:
    receiving an eSIM profile provisioning request by a subscription manager-data preparation+ (SM-DP+) server, wherein the provisioning request comprises an embedded UICC identifier (EID) number, a private identity code, and wireless communication service subscription information;
    building an eSIM profile package by the SM-DP+ server based in part on the wireless communication service subscription information, wherein the eSIM profile package comprises an eSIM profile, the EID number, and the private identity code;
    sending a notification of the availability of the eSIM profile by the SM-DP+ server to a subscription manager-discovery server (SM-DS server), wherein the notification comprises the EID number and the private identity code;
    receiving by the SM-DP+ server a request to download the eSIM profile from a wireless communication device associated with the EID number and associated with the private identity code; and
    transmitting the eSIM profile package by the SM-DP+ server to the wireless communication device, whereby the wireless communication device is enabled to detect and reject attempts to install an unauthorized eSIM profile on the wireless communication device by parties that do not know the private identity code.

2. The method of claim 1, wherein the eSIM profile comprises wireless communication service provider data and subscriber data.

3. The method of claim 1, wherein the eSIM profile comprises at least two selected from a list consisting of a phone number, a network access key, a network access credential, an encryption key, a preferred roaming lists, and an executable application.

4. The method of claim 1, wherein the wireless communication device is an Internet of things (IoT) device.

5. The method of claim 1, wherein the wireless communication device is a smart phone, a wearable computer, a laptop computer, a tablet computer, or a notebook computer.

6. The method of claim 1, wherein the private identity code is at least 3 bytes long and less than 25 bytes long.

7. The method of claim 1, wherein the private identity code is at least 20 bytes long and less than 150 bytes long.

8. A method of managing electronic subscriber identity module (eSIM) profiles on a wireless communication device, comprising:
    receiving a first input by an eSIM remote manager executing on a computer system, wherein the first input identifies a private identity code and associating that private identity code to a wireless communication device;
    storing the association of the private identity code and an identity of the wireless communication device by the eSIM remote manager in a non-transitory memory of the eSIM remote manager;
    receiving a second input by the eSIM remote manager, wherein the second input comprises the identity of the wireless communication device and identifies a command to download an eSIM profile, a command to install an eSIM profile, a command to enable an eSIM profile, a command to disable an eSIM profile, a command to read a status of an embedded universal integrated circuit card (eUICC) of the wireless communication device, or a command to delete an eSIM profile;

looking up the stored private identity code by the eSIM remote manager based on the identity of the wireless communication device received in the second input;

establishing communication with the wireless communication device by the eSIM remote manager; and sending a command message by the eSIM remote manager to the wireless communication device, wherein the command message comprises the private identity code and an identity of the command identified in the second input received by the eSIM remote manager, whereby the wireless communication device is able to detect and reject attempts to manage an eSIM profile of the wireless communication device by parties that do not know the private identity code.

9. The method of claim 8, wherein the first input provides the private identity code as a scanned image of a private identity code representation, and wherein receiving the first input comprises decoding the scanned image to obtain the private identity code.

10. The method of claim 8, wherein the private identity code of the command message sent by the eSIM remote manager is encrypted.

11. The method of claim 8, wherein the first input further identifies an embedded UICC identifier (EID) number associated with the wireless communication device, the eSIM remote manager stores the EID number with the private identity code and the identity of the wireless communication device, and the command message comprises the EID number.

12. The method of claim 8, wherein the wireless communication device is an Internet of things (IoT) device.

13. The method of claim 8, wherein the wireless communication device is a smart phone, a wearable computer, a laptop computer, a tablet computer, or a notebook computer.

14. The method of claim 8, wherein the eSIM remote manager executes on a subscription manager-data preparation+ (SM-DP+) server and uses remote profile management functions.

15. A wireless communication device, comprising:
a radio transceiver comprising a modem;
a non-transitory memory;
a processor coupled to the non-transitory memory;
an embedded universal integrated circuit car (eUICC) coupled to the modem; and
an application stored in the non-transitory memory that, when executed by the processor:
receives a notification message that an electronic subscriber identification module (eSIM) profile is ready for downloading, wherein the notification comprises a private identity code,
compares the private identity code received in the notification message to a private identity code stored in the non-transitory memory,
determines that the private identity code received in the notification message matches the private identity code stored in the non-transitory memory,
transmits an eSIM profile download request message via the radio transceiver to a subscription manager-data preparation+ (SM-DP+) server, wherein the request message does not comprise the private identity code,
receives an eSIM profile package from the SM-DP+ server comprising an eSIM profile and a private identity code,
compares the private identity code received in the eSIM profile package to the private identity code stored in the non-transitory memory,
determines that the private identity code received in the eSIM profile package matches the private identity code stored in the non-transitory memory, and
installs the eSIM profile in the eUICC.

16. The wireless communication device of claim 15, wherein the wireless communication device is an Internet of things (IoT) device.

17. The wireless communication device of claim 15, wherein the wireless communication device is a smart phone, a wearable computer, a laptop computer, a tablet computer, or a notebook computer.

18. The wireless communication device of claim 15, wherein the eSIM profile comprises at least two selected from a list consisting of a phone number, a network access key, a network access credential, an encryption key, a preferred roaming lists, and an executable application.

19. The wireless communication device of claim 15,
wherein the notification message comprises a first embedded UICC identifier (EID) number and the eSIM profile package comprises a second EID number;
wherein the application compares the first EID number received in the notification message to an EID number stored in the non-transitory memory, determines that the first EID number received in the notification message matches the EID number stored in the non-transitory memory, compares the second EID number in the eSIM profile package to the EID number stored in the non-transitory memory, and determines that the second EID number in the eSIM profile package matches the EID number stored in the non-transitory memory.

20. The wireless communication device of claim 15, wherein the non-transitory memory and the processor are part of the eUICC.

* * * * *